(12) United States Patent
Sakurai

(10) Patent No.: US 8,810,476 B2
(45) Date of Patent: Aug. 19, 2014

(54) WIRELESS APPARATUS

(75) Inventor: Masanori Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 434 days.

(21) Appl. No.: 13/148,845

(22) PCT Filed: Feb. 16, 2010

(86) PCT No.: PCT/JP2010/052581
§ 371 (c)(1),
(2), (4) Date: Aug. 10, 2011

(87) PCT Pub. No.: WO2010/098269
PCT Pub. Date: Sep. 2, 2010

(65) Prior Publication Data
US 2011/0309998 A1 Dec. 22, 2011

(30) Foreign Application Priority Data
Feb. 25, 2009 (JP) .................................. 2009-042293

(51) Int. Cl.
*H01Q 1/50* (2006.01)

(52) U.S. Cl.
USPC .......................................... 343/906; 343/702

(58) Field of Classification Search
USPC ........ 343/906, 702, 729, 895; 455/575.4, 566
See application file for complete search history.

(56) References Cited

U.S. PATENT DOCUMENTS

| 7,158,085 B2 * | 1/2007 | Shin et al. ..................... 343/702 |
| 2008/0211721 A1 | 9/2008 | Ohba et al. |
| 2013/0059629 A1 * | 3/2013 | Takagi .......................... 455/566 |

FOREIGN PATENT DOCUMENTS

| EP | 1814192 A1 | 8/2007 |
| EP | 1990980 A1 | 11/2008 |
| JP | 2006115048 A | 4/2006 |
| JP | 2006128808 A | 5/2006 |
| JP | 2006203806 A | 8/2006 |
| JP | 2007166046 A | 6/2007 |
| WO | 2006043326 A | 4/2006 |

OTHER PUBLICATIONS

The extended European search report for PCT/JP2010052581 mailed on Jun. 18, 2012.
International Search Report for PCT/JP2010/052581 mailed May 25, 2010.

* cited by examiner

*Primary Examiner* — Thien M Le
(74) *Attorney, Agent, or Firm* — Sughrue Mion, PLLC

(57) ABSTRACT

In a wireless apparatus which includes two circuit boards overlapping each other, it is contrived to improve antenna characteristics without using a sleeve ground part of a flexible cable.

A wireless apparatus 20 includes a first circuit board 21, a second circuit board 22 and a connector 23. An antenna element 25 is mounted to the first circuit board 21. The second circuit board 22 can be in a state that the second circuit board 22 overlaps with the first circuit board at least partially. The connector 23 has a shape extending from one side of an area overlapping the first circuit board 21 and the second circuit board 22 toward the other side. The connector 23 is connected electrically with the first circuit board 21 and the second circuit board 22. The connector 23 controls electrical current distribution which is generated in the first circuit board 21 and the second circuit board 22 due to applying an electrical current to the antenna element 25.

9 Claims, 15 Drawing Sheets

Smith Chart

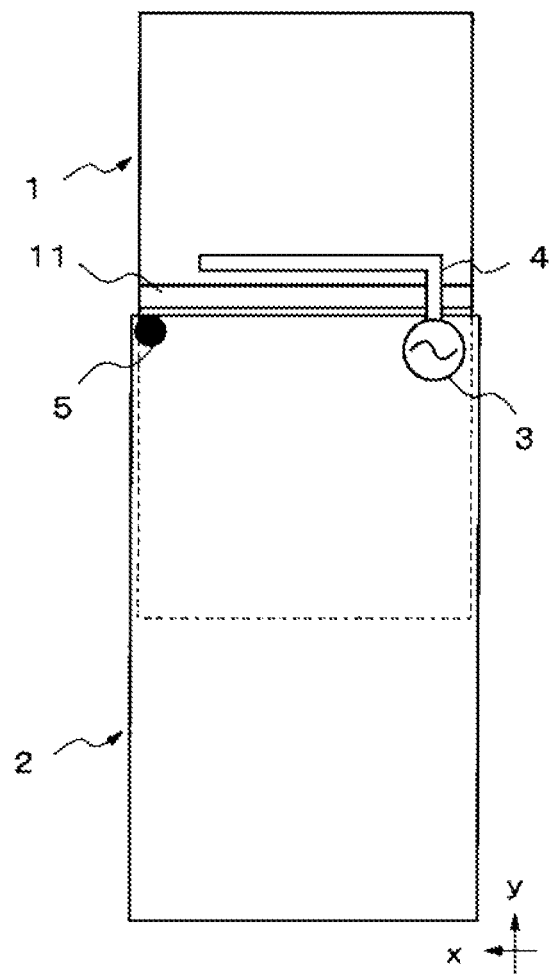

Smith Chart

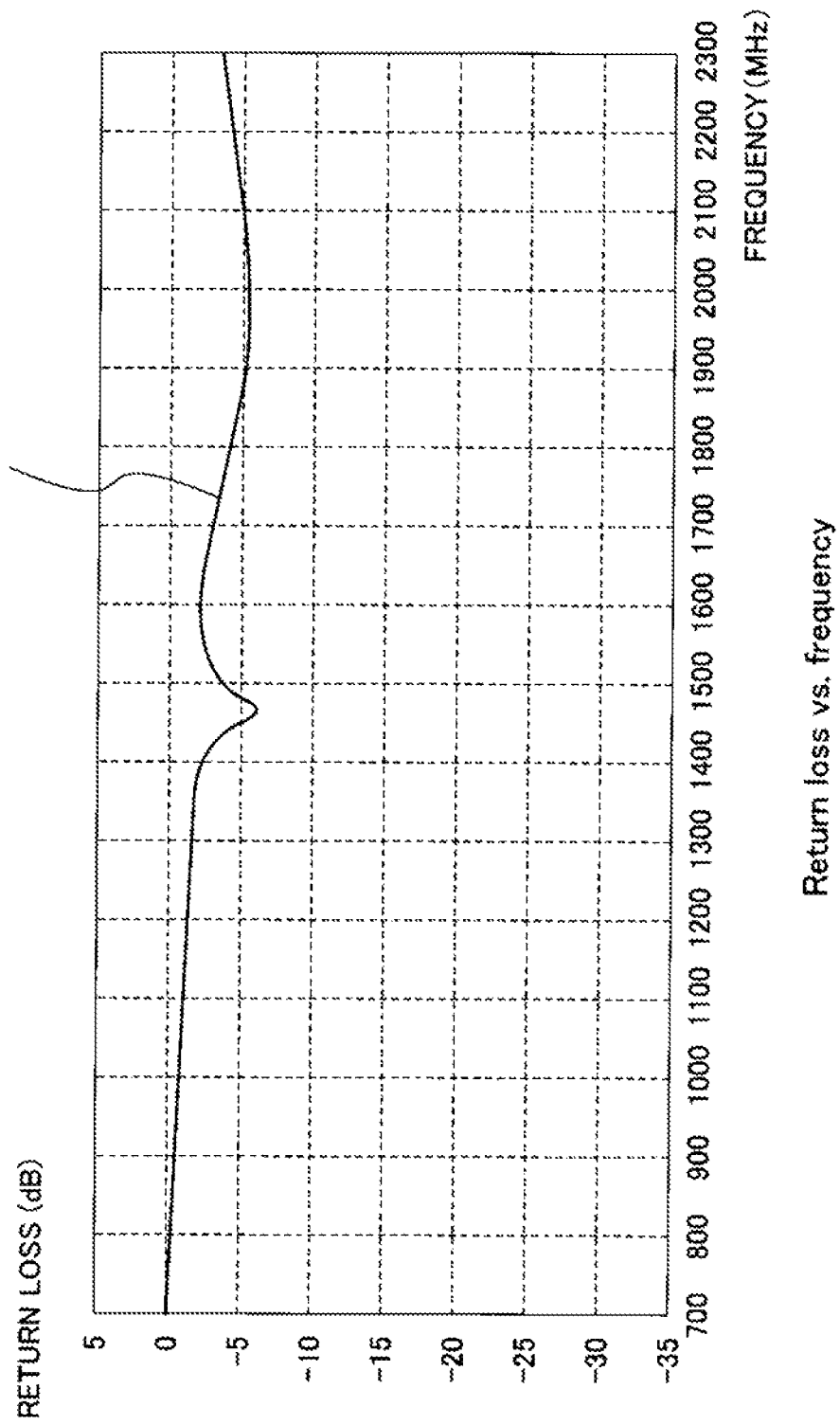

WIRELESS APPARATUS

TECHNICAL FIELD

The present invention relates to a wireless apparatus which can improve radiation efficiency of an antenna and realizes broadband.

BACKGROUND ART

In recent years, there are a folding type wireless apparatus, a slide type wireless apparatus, two axes rotation type wireless apparatus or the like. Such the type of wireless apparatus includes two chassis. Each of the two chassis houses a circuit board.

In recent years, external appearance design of the wireless apparatus is considered to be important. For this reason, it is in progress to miniaturize and thin down the chassis of the wireless apparatus. Moreover, it is on the increase that a communication antenna is built-in within the chassis so that the external appearance design may not be damaged.

An example of the wireless apparatus which includes two chassis will be described in the following with reference to FIG. 10a and FIG. 10b. The wireless apparatus is the slide type (so-called slide type terminal). The wireless apparatus includes a liquid crystal display (hereinafter, referred to as LCD) side's chassis (LCD-side chassis) 100 and a key side's chassis (key-side chassis) 200. The LCD side's chassis 100 includes a LCD display unit 101. The key side's chassis 200 includes a handling unit 201. The LCD side's chassis 100 and the key side' chassis 200 are combined so that it is possible to change from a closed state as shown in FIG. 10b to an opened state shown in FIG. 10a, and vice versa.

FIG. 11 shows schematically a state (internal structure) in which the chassis is removed from the slide terminal shown in FIG. 10a. Referring to FIG. 11, the LCD side's chassis 100 houses a LCD side's circuit board (LCD-side circuit board) 102. The key side's chassis 200 houses a key side's circuit board (key-side circuit board) 202. An antenna element 204 is mounted to the key side's circuit board 202 in a state projecting from the key side's circuit board 202. Moreover, the key side's circuit board 202 includes an antenna feeding point 203 at which the antenna element 204 and an electric supply line are connected.

An antenna system, which is used in the wireless apparatus, is designed so that not only the antenna but also the LCD side's circuit board 102 and the key side's circuit board 202 can transmit (emit) a radio wave and receive a radio wave. Moreover, each of the circuit boards 102 and 202 includes a wireless circuit which is not shown in the Figure.

FIG. 12a shows a view of the structure shown in FIG. 11 from the key side's circuit board 202 side. FIG. 12b is a schematic side view of the structure shown in FIG. 12a. That is, FIG. 12b is a schematic diagram of the specific structure shown in FIG. 13, for the sake of easy understanding.

According to the slide terminal shown in FIGS. 10a to 13, a large metal member (that is, LCD side's circuit board 102 which is assumed as the ground) is arranged near the antenna. In this case, the metal member near the antenna often causes an influence on antenna characteristics. FIG. 14 is a Smith chart showing impedance characteristics of the antenna element 204 in the 2G frequency band. FIG. 15 shows frequency characteristics of return-loss in the antenna element 204. FIG. 14 and FIG. 15 will be described later in detail.

In particular, in the case of the slide type terminal or the like whose LCD side's circuit board 102 and the key side's circuit board 202 overlap each other, an electrical current flowing in the LCD side's circuit board 102 and an electrical current flowing in the key side's circuit board 202 are opposite in phase. The antiphase electrical currents cause the antenna characteristics to degrade. Due to the LCD side's circuit board 102 and the key side's circuit board 202 overlapping each other, frequency bandwidth, where the antenna element 204 and the wireless circuit are matched, becomes narrow. It is well known that the above mention is one of causes to degrade the antenna characteristics. Also in the case of a wireless apparatus, which includes two circuit boards, other than the slide type terminal, it is well known that the antenna characteristics are degraded as mentioned above due to overlapping two circuit boards.

In the case that it is possible to make the chassis of the wireless apparatus thicken, it is possible that a distance between the LCD side's circuit board and the key side's circuit board is expanded in a direction of thickness of the chassis. As a result, the antiphase electrical currents, which flow in the LCD side's circuit board and the key side's circuit board respectively, become reduced. Thus, it is possible to reduce mutual influence due to the circuit boards. However, there is a tendency to make the chassis thin as mentioned above, and consequently the distance between two circuit boards become close. For this reason, the antenna characteristics are degraded.

Patent Literature 1 proposes an art, as a related art, which can make bandwidth of the antenna characteristics broadband. According to the art, electrical current distribution in a flexible cable is controlled appropriately by a sleeve ground part. Namely, the art disclosed in Patent Literature 1 relates to the flexible cable which connects a LCD's side circuit board ground and a key's side circuit board ground each other. Specifically, the flexible cable includes a central ground part and the sleeve ground part which is arranged at both sides of the central ground part. The central ground part connects the LCD's side circuit board ground and the key's side circuit board ground. The sleeve ground part connects only with the LCD's side circuit board ground.

CITATION LIST

Patent Literature 1: Japanese Patent Application Laid-Open No. 2007-166046

Patent Literature 2: Japanese Patent Application Laid-Open No. 2006-115048

SUMMARY OF INVENTION

Technical Problem

According to structure described in Patent Literature 1, it is essential to use the sleeve ground part of the flexible cable. Thus, the wireless apparatus, which does not include the sleeve ground part as a essential component, has difficulty in improving the antenna characteristics since the wireless apparatus cannot adopt the structure mentioned above.

The present invention is contrived to solve the problem mentioned above. That is, an object of the present invention is to provide a wireless apparatus which includes two circuit boards overlapping each other, and which can improve the antenna characteristics without using the sleeve ground part of the flexible cable.

Solution to Problem

A wireless apparatus in the present invention includes:

a first circuit board to which an antenna element is mounted;

a second circuit board which can be in a state overlapping with the first circuit board at least partially; and a connector which extends from one side of an area overlapping the first circuit board and the second circuit board toward the other side and is connected electrically with the first circuit board and the second circuit board, and the connector controls electrical current distribution, which is caused due to applying an electrical current to the antenna element, in the first circuit board and the second circuit board.

Advantageous Effects of Invention

According to the present invention, it is possible to improve the antenna characteristics without using the sleeve ground part of the flexible cable.

BRIEF DESCRIPTION OF DRAWINGS

FIG. 1a is a diagram explaining a slide type terminal according to a first exemplary embodiment.

FIG. 1b is a side view of the structure shown in FIG. 1a.

FIG. 5a is a diagram explaining a second exemplary embodiment.

FIG. 5b is a side view of the structure shown in FIG. 5a.

FIG. 6a is a diagram explaining a third exemplary embodiment.

FIG. 6b is a side view of the structure shown in FIG. 6a.

FIG. 7a is a diagram explaining a fourth exemplary embodiment.

FIG. 7b is a side view of the structure shown in FIG. 7a.

FIG. 9 is a diagram explaining further another exemplary embodiment.

FIG. 10b is a diagram explaining the slide type terminal together with FIG. 10a.

FIG. 12a is a plan view of the structure shown in FIG. 11.

FIG. 12b is a side view of the structure shown in FIG. 12a.

FIG. 15 is a graph showing an example of frequency characteristics of return-loss in an antenna element of the slide type terminal.

DESCRIPTION OF EMBODIMENTS

An exemplary embodiment according to the present invention will be described in the following with reference to the drawings.

A First Exemplary Embodiment

A wireless apparatus according to a first exemplary embodiment is a slide type terminal. While the slide type terminal according to the first exemplary embodiment is almost similar to the slide type terminal which is shown in FIGS. 10a to 13 mentioned above, a different point is that the slide type terminal according to the first exemplary embodiment includes a pin (connector) mentioned later.

That is, the slide type terminal according to the first exemplary embodiment includes a LCD side's chassis (LCD-side chassis) to which a LCD display unit is mounted, and a key side's chassis (key-side chassis) to which a handling unit is mounted. The LCD side's chassis and the key side' chassis are combined as well as the above-mentioned slide type terminal so that it is possible to change from a closed state to an opened state, and vice versa.

The LCD side's chassis houses a LCD side's circuit board (second circuit board). The key side's chassis houses a key side's circuit board (first circuit board). An antenna feeding point and an antenna element are arranged on the key side's circuit board (key-side circuit board). A wireless circuit unit or the like is mounted to the above-mentioned circuit boards.

An antenna system, which is used in the wireless apparatus, is designed so that not only the antenna but also the LCD side's circuit board (LCD-side circuit board) and the key side's circuit board can transmit (emit) a radio wave and receive the radio wave. Moreover, there are various shapes of the antenna element. As the shape of the antenna element, an upside down character L shape, a monopole shape, a helical shape, and a meander shape are exemplified.

Figure 1:
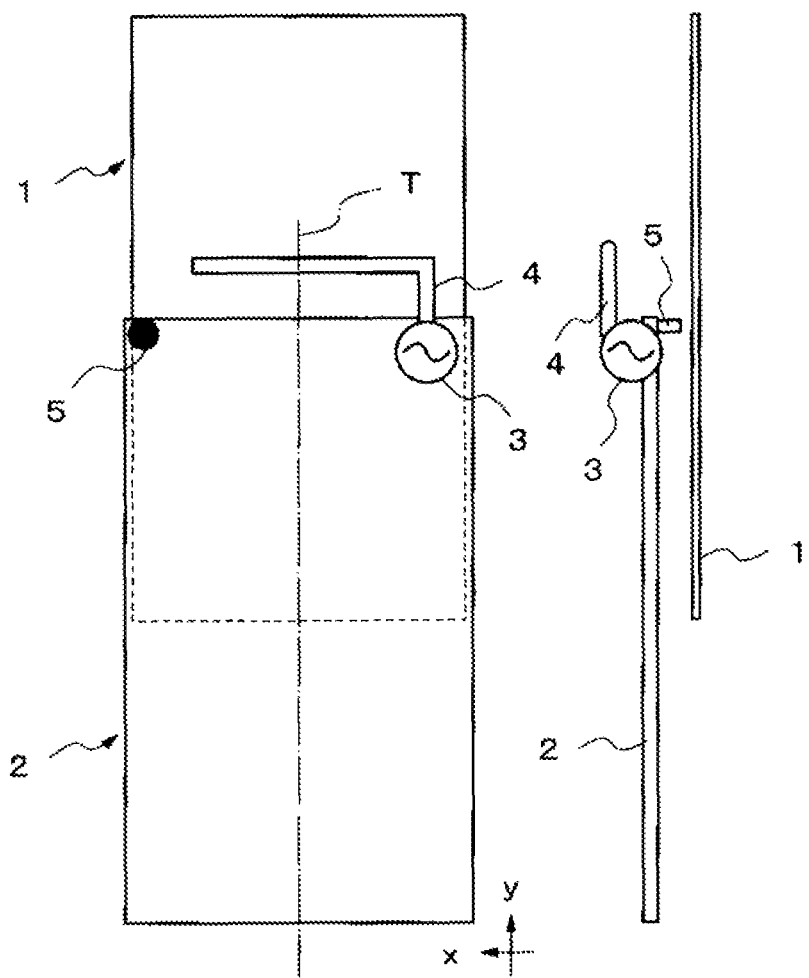
Figures 12A, 12B:
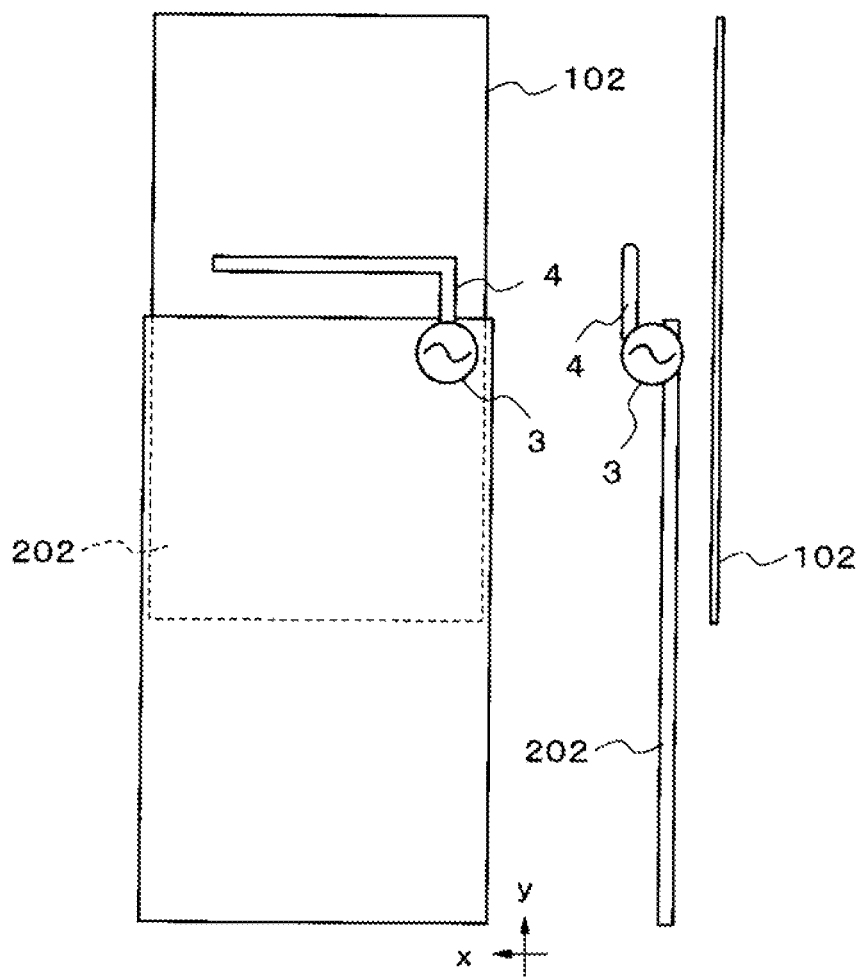
Figure 13:
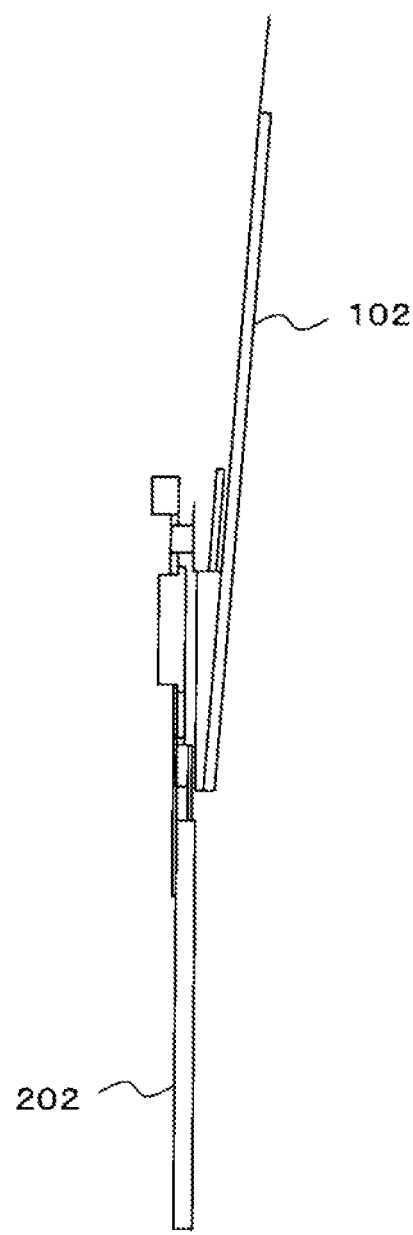
FIG. 13 shows an example of detailed internal structure of a chassis of the slide type terminal.

FIG. 1a and FIG. 1b, which correspond to FIG. 12a and FIG. 12b respectively, show the slide terminal according to the first exemplary embodiment. Even when the slide terminal becomes from the closed state to the opened state, parts of the LCD side's circuit board 1, the key side's circuit board 2 and an antenna element 4 overlap each other. In contrast, in the case of the folding type terminal (folding type wireless apparatus), the LCD side's circuit board 1 and the key side's circuit board 2 do not overlap each other when the folding type terminal is in the opened state.

In the structure of the slide terminal according to the first exemplary embodiment as shown in FIG. 1a, the LCD side's circuit board 1 and the key side's circuit board 2 overlap each other. Therefore, due to an electrical current which flows in the key side's circuit board 2, an electrical current whose phase is opposite to the phase of the electrical current in the key side's circuit board 2 is induced in the LCD side's circuit board 1.

That is, electrical power (electrical current), which is inputted to the antenna feeding point 3, flows in the antenna element 4 and the key side's circuit board 2. The electrical current, which flows in the key side's circuit board 2, induces the electrical current in the opposite LCD side's circuit board 1. The phase of the induced electrical current is opposite to the phase of the electrical current which flows in the key side's circuit board 2, and the induced electrical current causes an influence for radiation characteristics. Consequently, the antenna characteristics are degraded.

In the first exemplary embodiment, a pin 5 is mounted as shown in FIG. 1*a*. The pin 5 and the antenna feeding point 3 are arranged at symmetrical positions on the key side's circuit board 2 in a direction along the shorter side of the key side's circuit board 2. That is, the pin 5 and the antenna feeding point 3 are arranged at the symmetrical positions toward a center line T (so called symmetry line) of the key side's circuit board 2 as shown in FIG. 1*a*. The pin 5 may be arranged not at an end of the key side's circuit board 2 but at an inside position away from the end with a predetermined distance.

The pin 5 is a metallic member which connects electrically the LCD side's circuit board 1 and the key side's circuit board 2. Specifically, the pin 5 is a metallic member which connects electrically the ground included in the LCD side's circuit board 1 and the ground included in the key side's circuit board 2. For example, the pin 5 is mounted to the key side's circuit board 2 by being put into a hole formed in the key side's circuit board 2. The pin 5 is connected directly with the ground of the key side's circuit board 2. Moreover, an additional cost-up, which arises from using the pin 5, can be restrained as so to be slight.

As shown in FIG. 1*b*, the pin 5, which is mounted to the key side's circuit board 2, is long so as not to touch with the LCD side's circuit board 1, and the length of the pin 5 is set in advance. The pin 5 may be connected with the ground of the key side's circuit board 2 via a circuit component such as a capacitor and a coil. In this case, it is possible to assume the ground to extend long by using such circuit component. As a result, it is easy to improve the antenna characteristics so that the antenna characteristics may be optimum.

Figure 2:
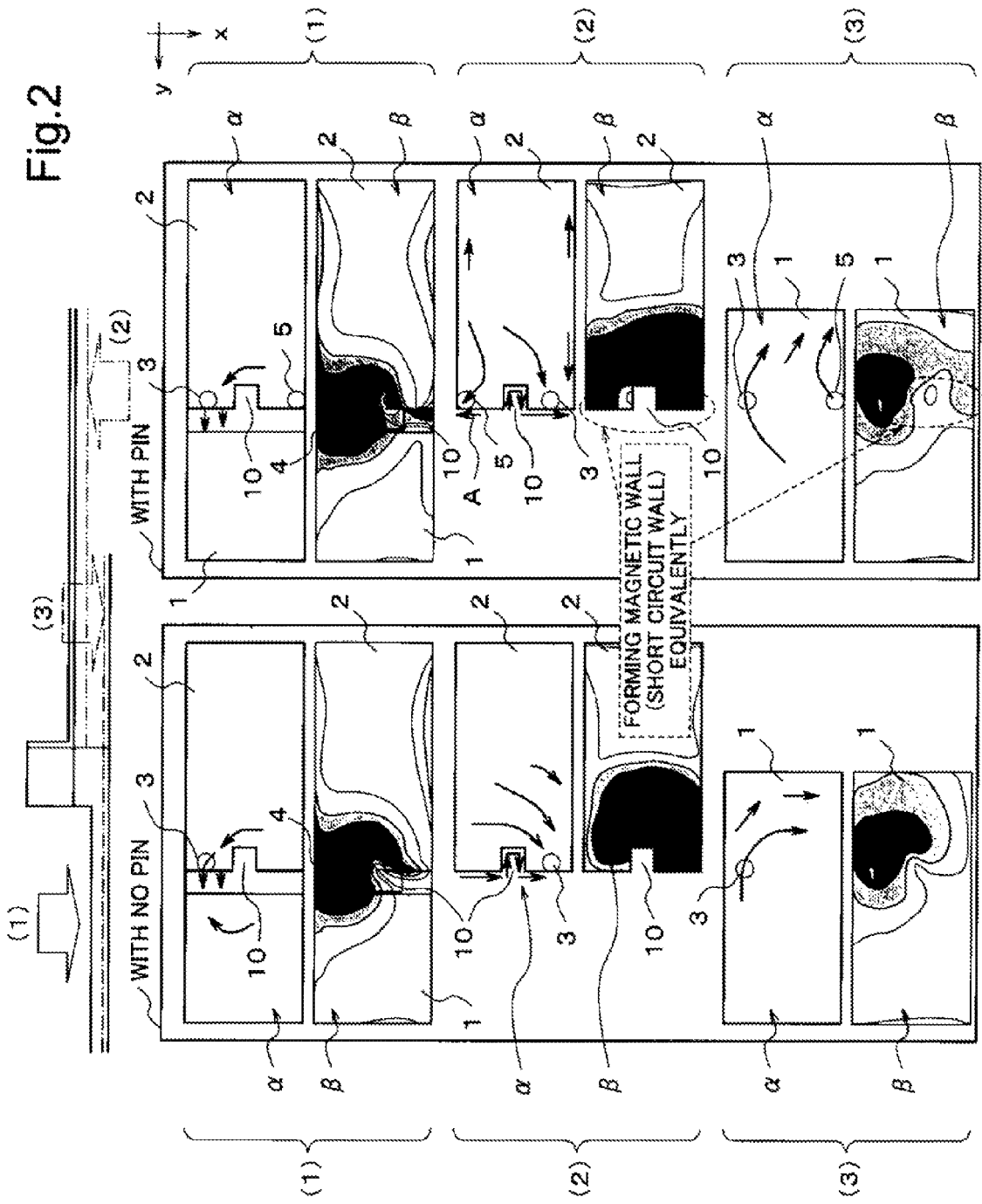
FIG. 2 is a diagram explaining an effect of the first exemplary embodiment.

FIG. 2 shows an example of a state of a generated electrical current at 1940 MHz in two slide type terminals, which include the same structure except for existence of the pin 5, in order to compare the generated electrical currents of two slide type terminals.

That is, according to FIG. 2, a figure indicated by code (1) is corresponding to a state in which the circuit boards 1 and 2 are rotated in the left direction by 90 degrees from the state shown in FIG. 1*a*. A figure indicated by code (2) is corresponding to a state in which the key side's circuit board 2 is rotated in the left direction by 90 degrees from the state shown in FIG. 1*a*, and which is viewed from the back side. A figure indicated by code (3) is corresponding to a state in which the LCD side's circuit board 1 is rotated in the left direction by 90 degrees from the state shown in FIG. 1*a*. Further, a direction in which the electrical current flows is represented by an arrow shown in an upper part α of each of the FIGS. (1) to (3). Electrical current distribution is represented with shading in a lower part β of each of the FIGS. (1) to (3). As an electrical current value becomes large, the shading becomes dark in the lower part β. Furthermore, directions for viewing the key side's circuit board 2 in the FIGS. (1) and (2) in FIG. 2 are different. There is a difference in viewing, that is, a difference between viewing the key side's circuit board 2 from the front, and viewing the key side's circuit board 2 from the back. There is a slight difference between the states of the generated electrical currents of the FIGS. (1) and (2) in FIG. 2. According to FIG. 2, a cutout part 10 is formed in the key side's circuit board 2 in order to arrange a camera system. In the case that the cutout part 10 is not formed, the basic state of the electrical current (direction where electrical current flows and electrical current distribution) is the same.

As shown in FIG. 2, in the case of the slide type terminal to which the pin 5 is not mounted, the electrical current in the key side's circuit board 2 due to applying the electrical current to the antenna element 4 flows mainly toward the feeding point 3, and consequently the electrical current concentrates to the feeding point 3. The electrical current does not contribute to radiation.

In contrast, in the case of the slide type terminal to which the pin 5 is mounted according to the first exemplary embodiment, a magnetic wall is formed equivalently at an end of the key side's circuit board 2 by mounting the pin 5. As a result, an electrical current which flows in a direction away from the feeding point 3 (for example, refer to electrical current A of FIG. (2) in FIG. 2) is generated at the end of the key side's circuit board 2. Not only the electrical current which flows in the antenna element but also the electrical current which flows in the circuit board are related to the antenna characteristics. According to the first exemplary embodiment, since the pin 5 is mounted, it is possible to generate the electrical current which can improve the antenna characteristics. Thus, it is possible to improve the antenna characteristics.

That is, according to the slide type terminal of the first exemplary embodiment, the LCD side's circuit board 1 and the key side's circuit board 2 are connected electrically each other via the pin 5. As a result, the electrical current distribution in the circuit boards 1 and 2 is different from one of the slide type terminal to which the pin 5 is not mounted, and consequently the antenna characteristics are improved. Furthermore, the electrical current concentration at the feeding point area of the key side's circuit board 2 is eased by mounting the pin 5. As a result, the electrical current in the overlapping area of the key side's circuit board 2 with the LCD side's circuit board 1 becomes reduced. Therefore, the induced electrical current, which flows in the overlapping area of the LCD side's circuit board 1 with the key side's circuit board 2, becomes reduced (for example, refer to FIG. (3) in FIG. 2).

The phase of the induced electrical current in the LCD side's circuit board 1 is opposite to the phase of the electrical current on the key side's circuit board 2. For this reason, a radio wave generated by the induced electrical current cancels out a radio wave generated by the electrical current in the key side's circuit board 2, in the case that the induced electrical current flows much. Consequently, the antenna characteristics are degraded.

In contrast, according to the first exemplary embodiment, the antenna characteristics is improved since it is possible to reduce the induced electrical current.

Figure 3:
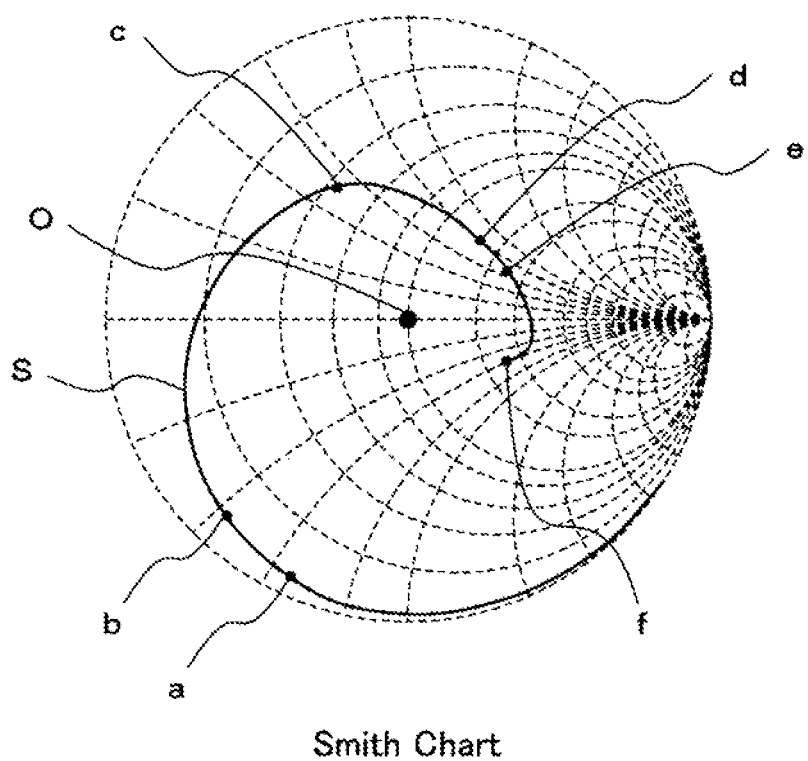
FIG. 3 is a Smith chart showing an example of impedance characteristics at an antenna feeding point of the wireless apparatus which includes the structure of the first exemplary embodiment.

A Smith chart, which represents impedance characteristics of the antenna structure in a 2G frequency band according to the first exemplary embodiment, is shown, for example, in FIG. 3. Moreover, frequency characteristics of return-loss is shown in FIG. 4.

Figure 14:
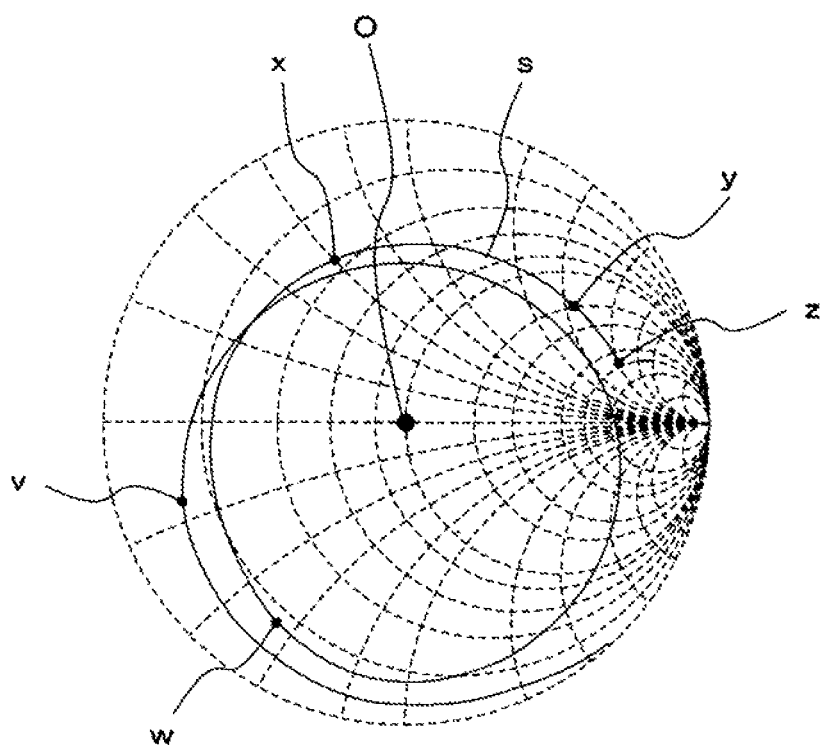
FIG. 14 is a Smith chart showing an example of impedance characteristics at an antenna feeding point of the slide type terminal.

The impedance characteristics of an antenna, which is mounted to the slide type terminal with no pin 5, is indicated by a solid line s in a Smith chart of FIG. 14. As shown by the solid line s, the impedance of the antenna in the slide type terminal with no pin 5 is far from a central point O in the Smith chart. With reference to FIG. 3 in comparison with FIG. 14, it is apparent that the impedance in the slide type terminal according to the first exemplary embodiment (refer to solid line S in FIG. 3) is near to the central point O of the Smith chart. It is conceivable that the electrical current distribution in the circuit boards 1 and 2 change, and an electromagnetic field becomes easy to be radiated from the LCD side' circuit board 1 and the key side's circuit board 2. In general, as the impedance of the antenna becomes near to the central point O in the Smith chart, fine impedance matching is obtained and power loss due to the reflection is reduced.

In addition, in FIG. 3, each of points a to f relates to the impedance at the following frequencies. That is, the point a relates to 1,427 MHz. The point b relates to 1,495 MHz. The point c relates to 1,710 MHz. The point d relates to 1,880 MHz. The point e relates to 1,990 MHz. The point f relates to 2,300 MHz. In FIG. 14, each of points v to z relates to the impedance at the following frequencies. That is, the point v relates to 1,427 MHz. The point w relates to 1,710 MHz. The point x relates to 1,990 MHz. The point y relates to 2,170 MHz. The point z relates to 2,300 MHz.

Figure 4:
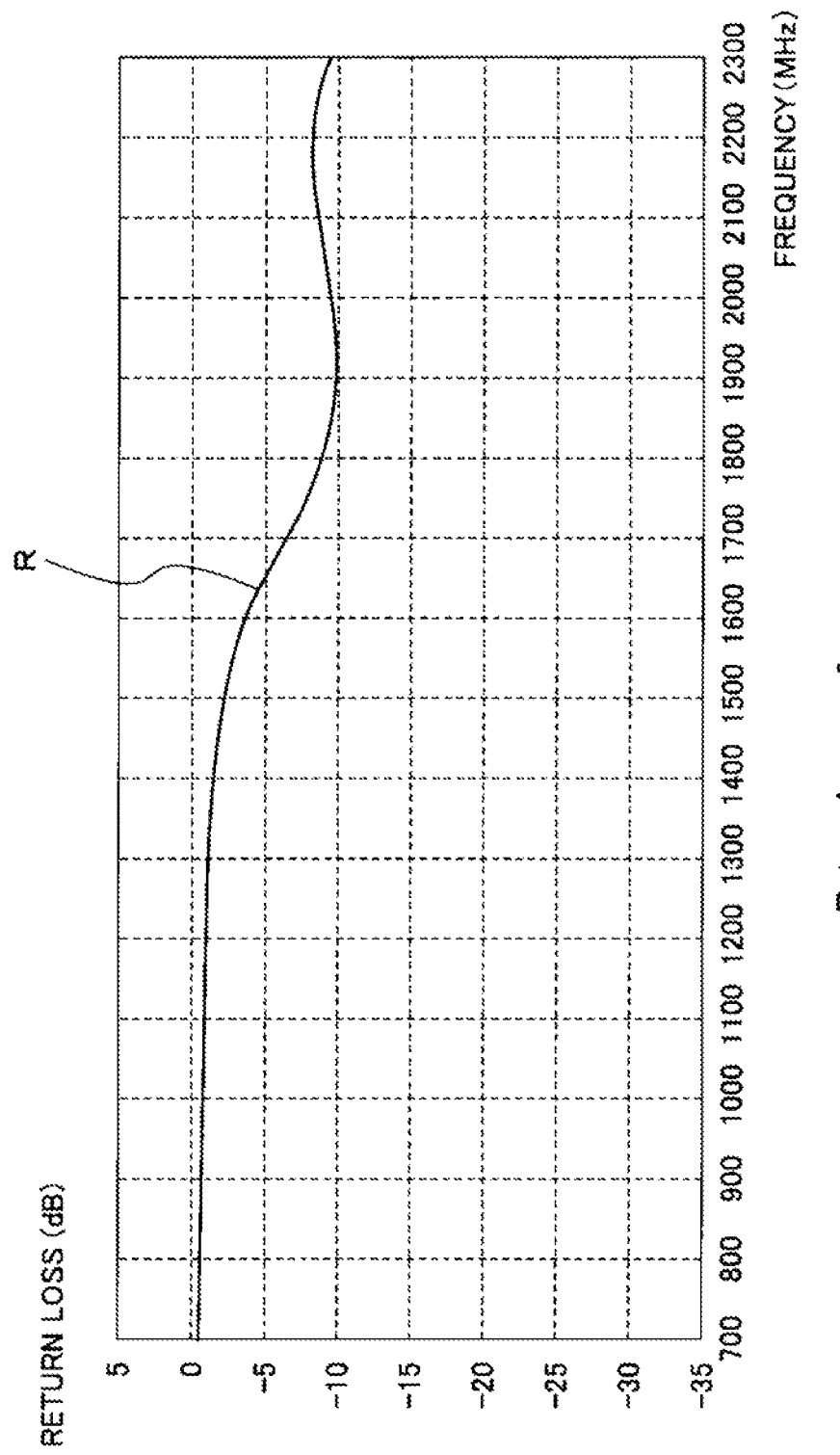
FIG. 4 is a graph showing an example of frequency characteristics of return-loss in an antenna element according to the first exemplary embodiment.

Since the above-mentioned impedance characteristics is obtained, the return-loss, which is shown by a solid line R in FIG. 4, is obtained. With regard to a frequency band of 1,700 MHz to 2,200 MHz, the return loss is about −7 dB at 1,700 MHz and about −9 dB at 2,200 MHz. That is, in a whole frequency band of 1,700 MHz to 2,200 MHz (bandwidth is 500 MHz), the return-loss which is −6 dB or less and is not worse is achieved. The −6 dB means a value indispensable to communication.

In contrast, with reference to a solid line r shown in FIG. 15, in the case of the slide type terminal with no pin 5, the return-loss is more than −6 dB in the whole frequency band of 1,700 MHz to 2,200 MHz (bandwidth is 500 MHz). That is, it is difficult to carry out good communication in the frequency band of 1,700 MHz to 2,200 MHz in the case of the slide type terminal with no pin 5.

As mentioned above, according to the first exemplary embodiment, because the pin 5 is mounted, it is possible to widen the bandwidth in which the antenna element 4 side and the radio circuit side are matched. And, it is realized that the frequency characteristics of the antenna is broadband.

A Second Exemplary Embodiment

Figure 5:
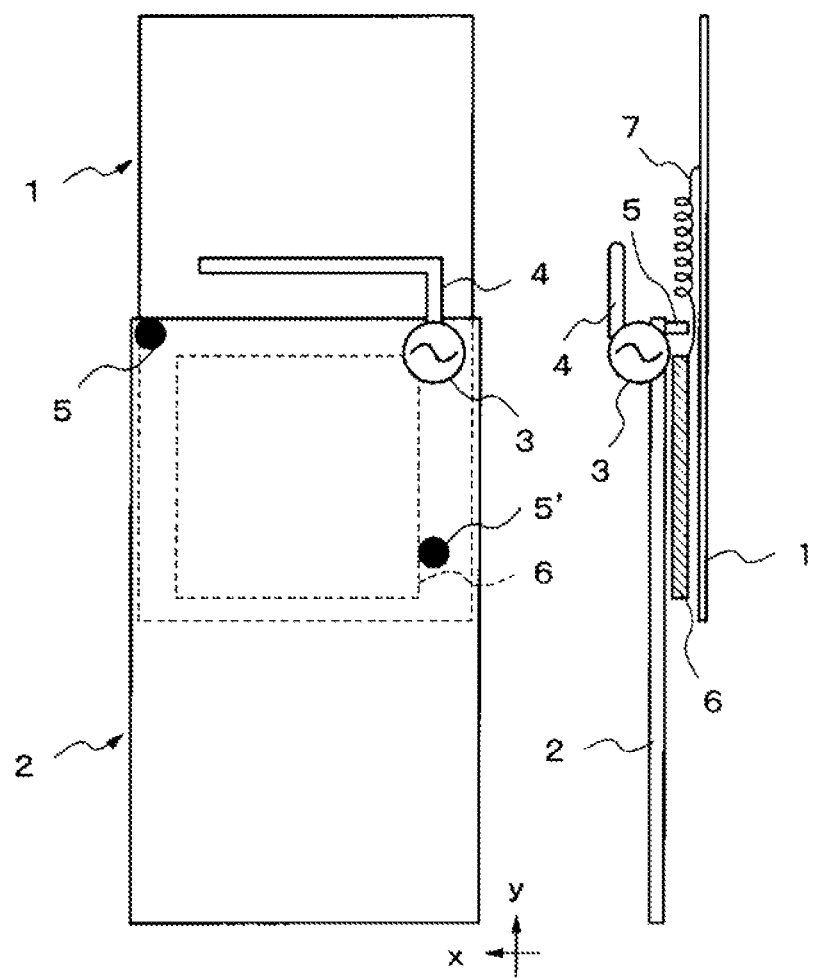

A basic structure of a slide type terminal according to a second exemplary embodiment is similar to the slide type terminal according to the first exemplary embodiment except for the following different point as shown in FIG. 5*a*. That is, a slide member 6 is arranged between the LCD side's circuit board 1 and the key side's circuit board 2. The slide member 6 is engaged with a guide-rail or the like which is mounted to the LCD side's circuit board 1 and allows the LCD side's circuit board 1 and the key side's circuit board 2 to slide relatively.

According to the second exemplary embodiment, the slide type terminal includes a pin 5' in addition to the pin 5 mentioned in the first exemplary embodiment. The additional pin 5' is arranged in the feeding point 3 side in area where the slide member 6 arranged. A reason why the pin 5' is added is to cope with an electrical current induced on the slide member 6 which is a metallic member.

Similarly, another pin 5' may be added in order to cope with an electrical current due to a flexible cable, a coaxial cable or the like which connects the LCD side's circuit board 1 and the key side's circuit board 2.

As shown in FIG. 5*b*, an elastic body 7 (for example, spring), which connects the slide member 6 and the key side's circuit board 2, may be used in some cases. In this case, the pin 5, for example, is arranged so as to touch with the slide member 6 toward the elastic body 7, in order to cope with an electric current induced in the elastic body 7.

The pin 5 may be arranged so as to touch with the slide member 6 toward the slide member 6. Moreover, there is a case that the slide member 6, the key side's circuit board 2 and the elastic body 7 form one metal unit substantially, and an electrical current is generated on the substantial metal unit. In the case, the additional pin 5' may not be essential.

The structure according to the second exemplary embodiment has an effect similar to the first exemplary embodiment. The effect is that it is possible to become broadband in the frequency characteristics of the antenna and to widen the bandwidth in which the impedance is matched, because of controlling the electrical current distribution in the circuit boards 1 and 2.

A Third Exemplary Embodiment

Figure 6:
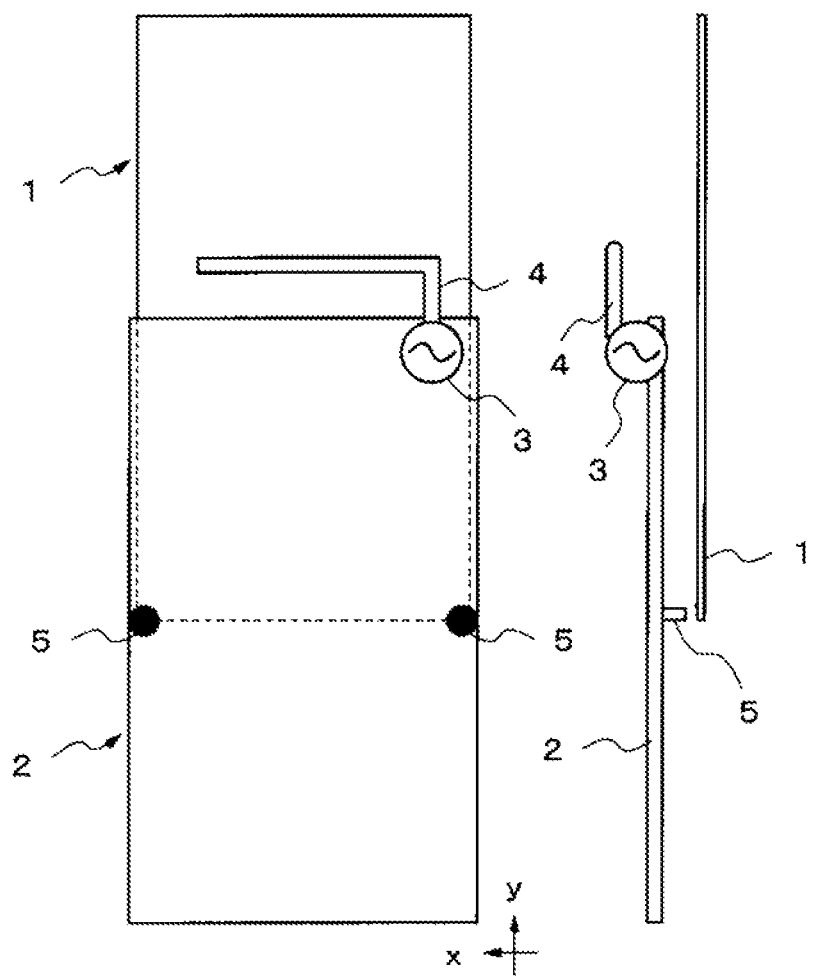

A structure of a slide type terminal according to a third exemplary embodiment is similar to the slide type terminal according to the first exemplary embodiment as shown in FIG. 6*a* and FIG. 6*b* except for the following different point mentioned later. The different point of the slide type terminal according to the third exemplary embodiment from the first exemplary embodiment is a position of the pin 5 and number of the pin 5. As shown by the slide terminals according to the first exemplary embodiment and the third exemplary embodiment, any position of the pin 5 and any number of the pin 5 may be preferable in order to generate the optimum electrical current distribution. In the case that a member (for example, slide member 6), which is related to the electrical current distribution, is arranged between the LCD side's circuit board 1 and the key side's circuit board 2 as described in the second exemplary embodiment, any position of the pin 5 and any number of the pin 5 may be preferable similarly. That is, any position and any number of the pin 5 are preferable in order to form the optimum electrical current distribution.

A Fourth Exemplary Embodiment

Figure 7:
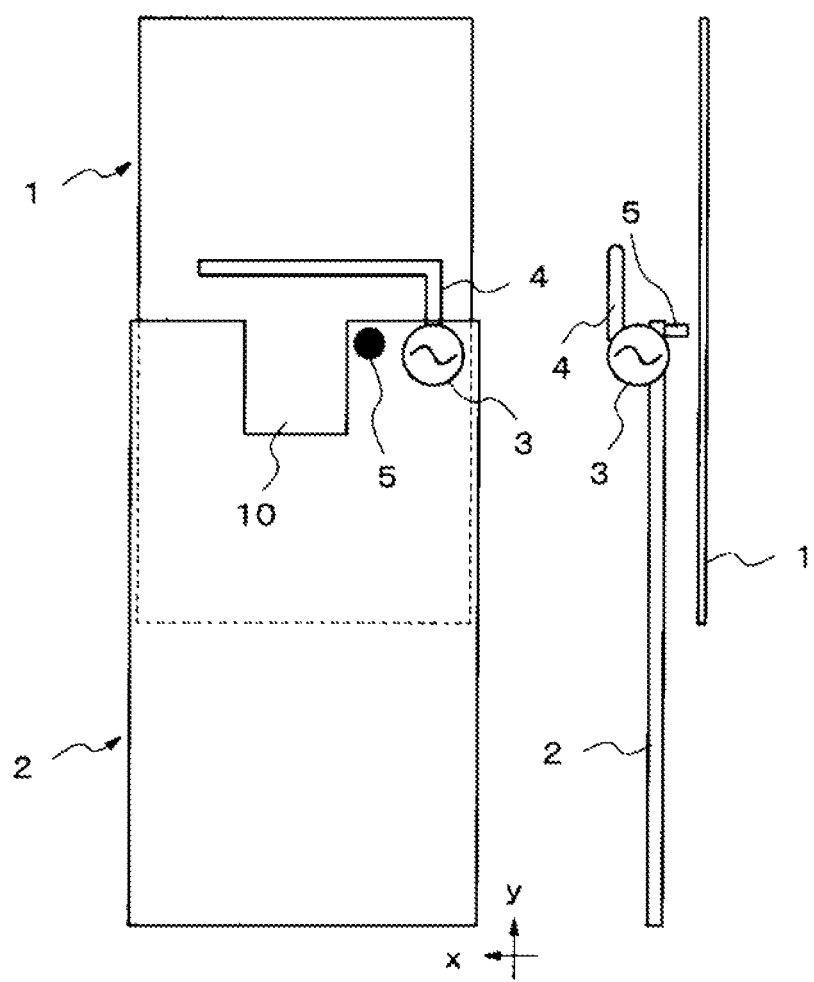

A structure of a slide type terminal according to a fourth exemplary embodiment is similar to the slide type terminal according to the first exemplary embodiment except for the following different point. That is, according to the fourth exemplary embodiment, the cutout part 10 is formed in the key side's circuit board 2 in order to arrange a camera system as shown in FIG. 7*a*. The pin 5 is arranged at a position nearer to the cutout part 10 than the pin 5 according to the first exemplary embodiment. A reason why the pin 5 is arranged at the position is to cope with an electrical current which is induced along the cutout part 10. The pin 5 may be shifted similarly to the case mentioned above even if the cutout part 10 mentioned above is mounted in addition to the structure according to the second exemplary embodiment.

The structure according to the fourth exemplary embodiment can control the electrical current as well as the structure according to each of the exemplary embodiments mentioned above, even if the cutout part 10 is arranged in the key side's circuit board 2. As a result, it is possible to improve the antenna characteristics.

Other Exemplary Embodiments

The present invention is not limited to the first to the fourth exemplary embodiments, and can adopt various embodiments. For example, according to another exemplary embodiment of the wireless apparatus, an upper circuit board and a lower circuit board overlap each other, and an antenna element is mounted to an end of area overlapping the lower circuit board with the upper circuit board, and a connection point which connects electrically the upper circuit board and the lower circuit board is arranged. As a result, even an apparatus, which includes two overlapping circuit boards, can improve the antenna characteristics.

Figure 8:
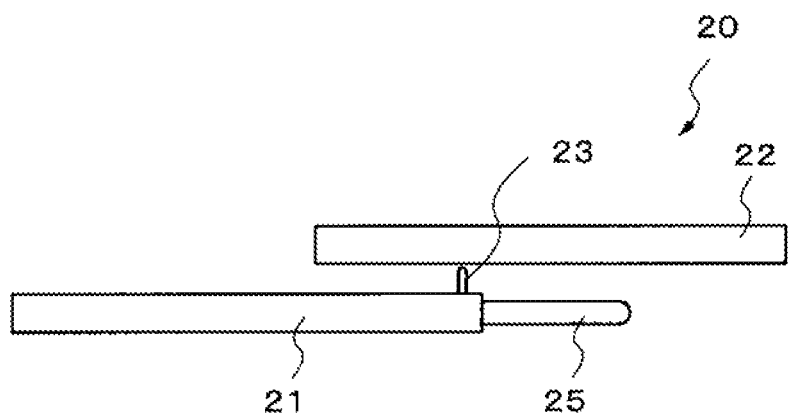
FIG. 8 is a diagram explaining another exemplary embodiment.
Figure 10A:
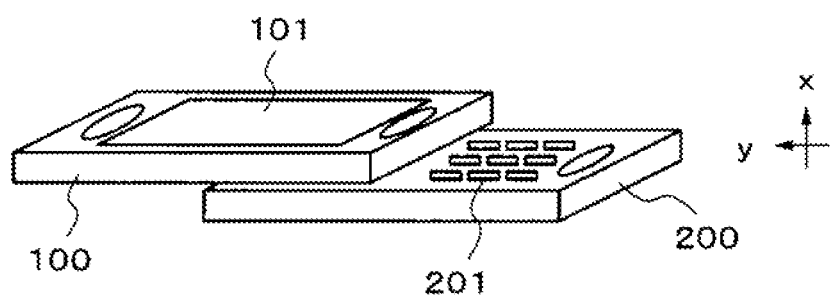
FIG. 10a is a diagram explaining a slide type terminal together with FIG. 10b.
Figure 10B:
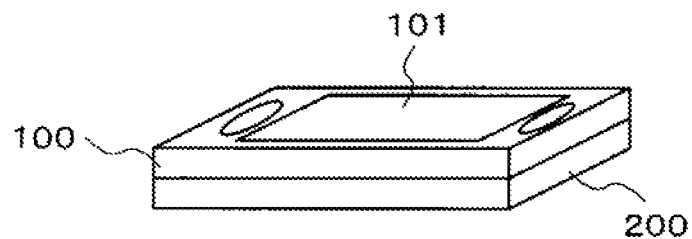
Figure 11:
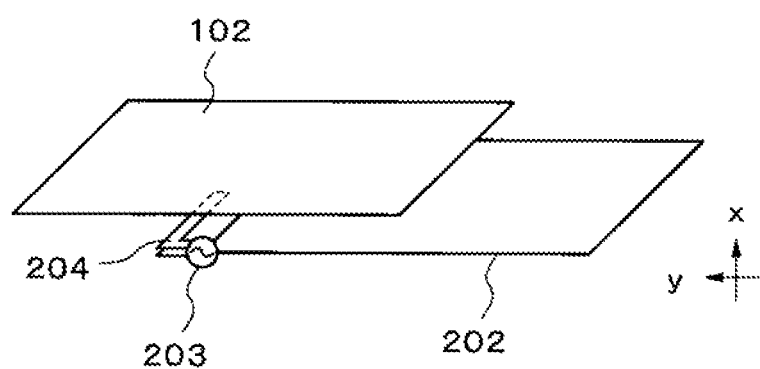
FIG. 11 is another diagram explaining the slide type terminal.

According to further another exemplary embodiment, as shown in FIG. 8, a wireless apparatus 20 includes a first circuit board 21, a second circuit board 22 and a connector 23.

An antenna element 25 is mounted to the first circuit board 21. The second circuit board 22 can be in a state that the second circuit board 22 overlaps with the first circuit board at least partially. The connector 23 has a shape extending from one side of an area overlapping the first circuit board 21 and the second circuit board 22 toward the other side. The connector 23 is connected electrically with the first circuit board 21 and the second circuit board 22. The connector 23 controls electrical current distribution which is generated in the first circuit board 21 and the second circuit board 22 due to applying an electrical current to the antenna element 25. Since the electrical current distribution in the first circuit board 21 and the second circuit board 22 is related to the antenna characteristics, it is possible to improve the antenna characteristics by controlling the electrical current distribution.

Furthermore, there is a case that a chassis is not the slide type chassis but a chassis whose LCD side's chassis is rotated around a key side's chassis and overlaps with the key side's chassis. A slit may be arranged in the circuit board in an apparatus which includes the chassis mentioned above, in order to improve the antenna characteristics. Of course, the slit mentioned above may be arranged in the slide type terminal. For example, specifically, as shown in FIG. 9, a slit (concave part) 11 is formed in a part of the LCD side's circuit board 1 opposite to the antenna element 4. The structure can improve the antenna characteristics furthermore.

Furthermore, the slide member 6 may touch with the pin 5 or connect with the pin 5. In other words, the slide member 6 may be connected with the ground of the key side's circuit board 2 electrically by the pin 5. Furthermore, the slide member 6 may be connected with the ground of the LCD side's circuit board 1 electrically via the elastic body 7. That is, not only the pin 5 but also the slide member 6 connects electrically the LCD side's circuit board 1 and the key side's circuit board 2.

Moreover, while the slide type terminal is exemplified as the wireless apparatus according to the first to the fourth exemplary embodiments, the present invention is not limited to the slide type terminal. The present invention can be applied to a wireless apparatus including two circuit boards which are able to be in a state that two circuit boards overlap each other at least partially.

While the present invention has been particularly shown and described with reference to exemplary embodiments thereof, the present invention is not limited to these embodiments. Various changes in form and details of the present invention, which are able to be understood by those of ordinary skill in the art, can be made therein without departing from the spirit and scope of the present invention.

Further, this application is based upon and claims the benefit of priority from Japanese Patent Application No. 2009-042293, filed on Feb. 25, 2009, the disclosure of which is incorporated herein in its entirety by reference.

INDUSTRIAL APPLICABILITY

The present invention is effective for a wireless apparatus including a plurality of circuit boards which are related to sending and receiving a radio wave by an antenna.

REFERENCES SIGNS LIST

1 LCD side's circuit board
2 key side's circuit board
3 feeding point
4 antenna element
5 pin

The invention claimed is:

1. A wireless apparatus, comprising:
a first circuit board to which an antenna element is mounted;
a second circuit board which can be in a state overlapping with the first circuit board at least partially; and
a connector which extends from one side of an area overlapping the first circuit board and the second circuit board toward the other side and is connected electrically with the first circuit board and the second circuit board, and the connector controls electrical current distribution, which is caused due to applying an electrical current to the antenna element, in the first circuit board and the second circuit board,
wherein one end side of the connector is connected with the first circuit board, and the other end side of the connector does not touch with the second circuit board.

2. The wireless apparatus according to claim 1, wherein the wireless apparatus includes a plurality of the connectors.

3. The wireless apparatus according to claim 1, wherein an part connecting electrically the antenna element with the first circuit board, and an part connecting electrically the connector with the first circuit board are arranged at symmetric toward a predetermined center line of the first circuit board.

4. The wireless apparatus according to claim 1, further comprising:
a slide member which makes the first circuit board and the second circuit board slide relatively,
wherein the first circuit board and the second circuit board are connected also by the slide member.

5. The wireless apparatus according to claim 4, wherein an part connecting electrically the antenna element with the first circuit board is arranged in a position which is away from an part connecting electrically the connector with the first circuit board by a predetermined distance in a sliding direction.

6. The wireless apparatus according to claim 4, wherein the connector is connected with the slide member electrically.

7. The wireless apparatus according to claim 4, further comprising:
an elastic body which is made of conductor, and which connects the slide member and the second circuit board,
wherein the slide member is fixed on the first circuit board, the slide member connects electrically the first circuit board and the second circuit board via the elastic body.

8. The wireless apparatus according to claim 1, wherein in the case that the antenna element can be in a state which is opposite to the second circuit board, in the second circuit board, a concave part is further arranged in a part which is opposite to the antenna element.

9. The wireless apparatus according to claim 1, wherein the connector is in a shape of a pin.

* * * * *